United States Patent Office 3,493,568
Patented Feb. 3, 1970

---

3,493,568
NOVEL OXAZOLINES AND OXAZINES
Alan J. Levy, Somerville, N.J., and Morton H. Litt, University Heights, Cleveland, Ohio, assignors to Allied Chemical Corporation, New York, N.Y., a corporation of New York
No Drawing. Continuation-in-part of application Ser. No. 599,691, Dec. 7, 1966. This application Apr. 24, 1969, Ser. No. 819,540
Int. Cl. C07d 87/14, 85/36
U.S. Cl. 260—244    5 Claims

ABSTRACT OF THE DISCLOSURE

Cyclic iminoethers of the structure:

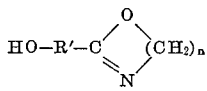

wherein $n$ is 2 or 3 and wherein R' is an alkyl or alkenyl group or halogenated derivative thereof of 5 to 17 carbon atoms, can be polymerized to give valuable crosslinked polymeric structures or copolymerized with alkyl or aryl oxazolines or oxazines in which later reaction they serve as molecular weight extenders.

CROSS-REFERENCE TO RELATED APPLICATIONS

This application is a continuation-in-part of our copending, commonly assigned application Ser. No. 599,691 filed Dec. 7, 1966 and now abandoned.

BACKGROUND OF THE INVENTION

This invention relates to novel oxazolines and oxazines having hydroxyalkyl substituents on the 2-position and to crosslinked polymers prepared therefrom.

Copending application Ser. No. 382,343 of Litt, et al., filed July 13, 1964, discloses a process for preparing polymers from 2-substituted-2-oxazolines in which the substituent in the 2-position is a hydrocarbon or halogenated hydrocarbon radical. During polymerization, the heterocyclic ring opens and polymers are formed which consist essentially of recurring units of the formula:

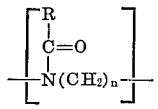

wherein R is the hydrocarbon or a halogenated hydrocarbon radical and $n$ is 2 or 3. As is apparent from the above formula, the substituents R do not react during polymerization, and the backbone chain of the polymer is substantially linear.

SUMMARY OF THE INVENTION

In accordance with the present invention, novel 2-substituted-2-oxazolines and oxazines have been discovered which contain a reactive ω-hydroxy group on the 2-substituent. These compounds are represented by the formula:

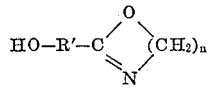

wherein R' is an alkyl or alkenyl group or halogenated derivative thereof of 5 to 17 carbon atoms and $n$ is 2 or 3. The hydroxy groups react during polymerization to give crosslinked polymeric structures such as

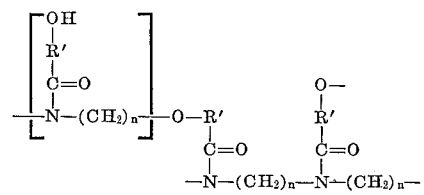

These polymers can be formed into useful coatings, films, and molded articles particularly by polymerization in place enabling rapid formation of finished articles. Additionally, as disclosed in copending application Ser. No. 599,718 filed Dec. 17, 1966, when the compounds of the present invention are mixed with the monomers of copending application Ser. No. 382,343 filed July 13, 1964 in amounts of up to 15%, they serve as molecular weight extenders upon polymerization of the mixture.

The oxazolines and oxazines of the present invention can be prepared by cyclodehydration of the corresponding β- or γ-hydroxyalkyl N-(ω-hydroxyalkyl or alkenyl) amide. These amides have the formula:

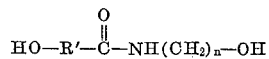

They can be prepared by reacting an ω-hydroxyalkyl carboxylic acid with ethanolamine or 3-hydroxypropyl amine (3-aminopropanol) as illustrated in the following equation:

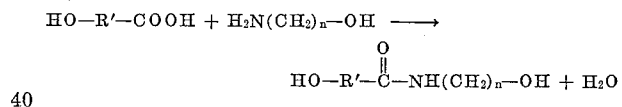

When $n=2$, oxazolines are formed, and oxazines when $n=3$. Alternatively, when a suitable lactone is available, it can be substituted for the ω-hydroxyalkyl carboxylic acid in the foregoing reaction. This is illustrated in the following reaction where the lactone is caprolactone:

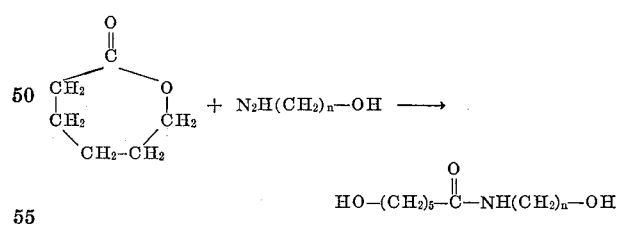

The preferred method of cyclodehydrating the β- or γ-hydroxyalkyl N-(ω-hydroxyalkyl or alkenyl)amide is to pass it in the vapor phase over a silica- or alumina-containing catalyst which has been heated to at least 150° C. This procedure is described in detail in our copending patent application Ser. No. 382,342 filed July 13, 1964. The cyclodehydration can also be effected with sulfuric acid in accordance with known procedures.

The ω-hydroxyalkyl or alkenyl oxazolines and oxazines of this invention can be polymerized in the presence of a cationic catalyst such as alkyl halides, boron-fluorine compounds, antimony-fluorine compounds, strong acids, salts of strong acids, with an oxazoline or an oxazine, esters of strong acids, strongly acidic ion exchange resins, and acid-activated clays. Illustrative of suitable catalysts are methyl iodide; 1,4-dibromobutane; boron trifluoride etherate; antimony pentafluoride; p-toluene sulfonic acid; dimethyl sulfate; sulfuric acid; nitric acid; perchloric acid; hydrobromic acid; hydroiodic acid; methyl sulfate; methyl-p-toluene sulfonate; salts of 2-phenyl-2-oxazines with perchloric acid, hydroiodic acid and toluene sulfonic acid, and the percholate salt of 2-(p-chlorophenyl)-2-oxazoline. The temperature at which the polymerization is carried out can range from about 25° to 250° C. with a preferable temperature range being from about 80° to 200° C. The time required to polymerize the monomer can vary from several minutes to several days depending upon the reactants, temperature, the particular monomer use, the catalyst employed, the monomer-to-catalyst ratio, and the desired molecular weight. In general, it is preferred to employ a molar ratio of about 10 to 60,000 mols of monomer per mol of catalyst.

The following examples are given to further illustrate the instant invention, but it is to be understood that the invention is not to be limited in any way by the details described therein. In the examples, parts and percent are by weight.

EXAMPLE 1

375 parts of 10-hydroxy decanoic acid, 135 parts of ethanolamine and 200 parts of xylene are charged to a flask and heated to reflux. The water produced by the reaction and the solvent are distilled off. 445 parts of a gray-green viscous liquid is obtained which solidifies on standing.

The solidified product is recrystallized from acetonitrile and N-(β-hydroxyethyl)decanamide obtained as a white crystalline solid.

The apparatus used for cyclodehydration is a column 10" long by 1" diameter, one end of the column being attached to a flask by means of a Claisen head and the other end of the column connected to a receiving vessel by means of a side arm. The column slopes downward at a slight angle from the Claisen head to the receiving vessel. Independent heating means are used to heat the flask and the column. The receiving vessel is immersed in a cooling bath. The flask is provided with a gas inlet tube so that a stream of nitrogen can be passed into the liquid charge contained in the flask. The side arm between the column and the receiving vessel is attached to a vacuum pump.

The column described above is filled with 100 parts of kaolin, a clay containing about 40% alumina and about 55% silica, and heated to 280° C. One hundred parts of N-(β-hydroxyethyl)-10-hydroxydecanamide, as prepared above, is charged to the flask and a nitrogen pressure of 3–4 mm. Hg established in the system. The vapor stream from the flask, which is heated to 300° C., is fed over the heated catalyst and condensed in the chilled receiving vessel over a 2-hour period. A 32% yield of 2-(p-hydroxynonyl)-Δ²-oxazoline is obtained.

EXAMPLE 2

375 parts of 10-hydroxy decanoic acid, 165 parts of 3-aminopropanol and 200 parts of xylene are charged to a flask and heated to reflux. The water produced by the reaction and the solvent are distilled off. 460 parts of a brown viscous liquid is obtained which solidified on standing.

The solidified product is recrystallized from acetonitrile and N-(γ-hydroxypropyl)decanamide obtained as a white crystalline solid. The apparatus and cyclodehydration procedure utilized were the same as in Example 1. A 47% yield of 2-(p-hydroxynonyl)-Δ²-1,3,4H-oxazine is obtained.

Other oxazolines or oxazolines within the scope of this invention having different hydroxyalkyl substituents on the 2-position are obtained by replacing the 10-hydroxydecanoic acid with an equal number of mols of another suitable acid. Illustrative of other suitable acids and the 2-substituents thus obtained are 8-hydroxyoctanoic acid to give the substituent —$(CH_2)_7$—OH; 11-hydroxyundecyclic acid to give the substituent —$(CH_2)_{10}$—OH; pentadecanol-(15)-acid-(1) (angelica root acid) to give the substituent —$(CH_2)_{14}$—OH; hexadecen-(7) - ol - (16)-acid-(1) (muskseed oil acid) to give the substituent

—$(CH_2)_8$—CH=CH$(CH_2)_5$—OH 18-hydroxyoctadecanoic acid to give the substituent —$(CH_2)_{17}$—OH; and the acid

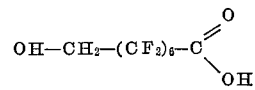

to give the substituent —$(CF_2)_6$—$CH_2$—OH.

EXAMPLE 3

131.5 parts of caprolactone, 73.8 parts of ethanolamine and 435 parts of chloroform are charged to a flask and heated at reflux for 8 hours. The mixture forms two layers. The solvent is removed from the organic layer under vacuum and the solid product washed with ether collected by filtration and dried. N-(β-hydroxyethyl)-6-hydroxycaproamide is obtained as a white solid in 93% yield. After recrystallization from dioxane, it has a melting point of 75.5°–76.5° C. The structure is confirmed by infrared and elemental analyses.

The column, as described in Example 1, is filled with 88.5 parts of kaolin catalyst and heated to 275° C. 196 parts of N-(β-hydroxyethyl)-6-hydroxycaproamide, as prepared above, is charged to the flask and a nitrogen pressure of 2–3 mm. Hg established in the system. The amide is distilled through the column over a 4.5-hour period.

2-(5-hydroxypentyl)-2-oxazoline is obtained in 50% yield. The product is redistilled through a spinning band column to give a pale yellow liquid having a boiling point of 88.0°–88.5° C./0.02 mm. Hg and an index of refraction $n_D^{21°}$ C.=1.4745. The structure is confirmed by infrared analysis.

*Elemental analysis.*—Calculated for $C_8H_{15}NO_2$. Theory: C, 61.1; H, 9.6; N, 8.9. Found: C, 61.2; H, 9.8; N, 9.4.

EXAMPLE 4

6.58 parts of the 2-(5-hydroxypentyl)-2-oxazoline prepared in Example 3 is distilled into a polymerization tube containing 0.044 part of the perchlorate salt of 2-(p-chlorophenyl)-2-oxazoline (monomer/catalyst mol ratio of 269/1) and the tube sealed under reduced pressure. The tube is placed in an oven and heated for 2 hours at 100° C. and then for 2.5 hours at 160° C. On cooling, a clear orange colored solid polymer is obtained. The polymer is insoluble in chloroform, methanol, m-cresol, dimethyl formamide, formic acid, and cold concentrated sulfuric acid. This insolubility indicates that the polymer is highly crosslinked.

By substituting the monomers described in Example 1 or Example 2 for the 2-(5-hydroxypentyl)-2-oxazoline employed in the foregoing procedure, one obtains polymeric materials having structures with a side chain corresponding to that of the monomers employed.

We claim:
1. A compound of the formula:

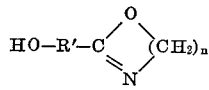

wherein R′ is an alkyl, alkenyl or halogenated alkyl or alkenyl radical of 5 to 17 carbons, and wherein $n$ is 2 or 3.

2. A compound in accordance with claim 1 wherein R' is an alkenyl or halogenated alkenyl radical and wherein $n$ is 2.

3. A compound in accordance with claim 1 wherein said R' group is an alkyl group or halogenated alkyl group and wherein $n$ is 2.

4. 2-(5-hydroxypentyl)-2-oxazoline.

5. A compound in accordance with claim 1 wherein $n$ is 3.

References Cited

UNITED STATES PATENTS 2,372,409  3/1945  Tryon _____ 260—307

OTHER REFERENCES

Seeliger, Angewandte Chemie, vol. 78, pp. 921–922 (1966).

Wehrmeister, Chemical Abstracts, vol. 63, p. 610 (1965).

ALTON D. ROLLINS, Primary Examiner

U.S. Cl. X.R.

260—307, 2, 561, 535